(12) United States Patent
Williamson et al.

(10) Patent No.: US 8,746,440 B2
(45) Date of Patent: Jun. 10, 2014

(54) CONTINUOUS RECOVERY SYSTEM FOR ELECTROREFINER SYSTEM

(75) Inventors: Mark A. Williamson, Naperville, IL (US); Stanley G. Wiedmeyer, Glen Ellyn, IL (US); James L. Willit, Batavia, IL (US); Laurel A. Barnes, Chicago, IL (US); Robert J. Blaskovitz, Lockport, IL (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 146 days.

(21) Appl. No.: 13/335,140

(22) Filed: Dec. 22, 2011

(65) Prior Publication Data

US 2013/0161160 A1 Jun. 27, 2013

(51) Int. Cl.
- *B65G 19/22* (2006.01)
- *B65G 19/14* (2006.01)
- *B65G 45/14* (2006.01)

(52) U.S. Cl.
CPC ..................................... *B65G 19/14* (2013.01); *B65G 45/14* (2013.01)
USPC ............................. 198/727; 198/728; 198/498

(58) Field of Classification Search
USPC .................................. 198/494, 498, 717–734
See application file for complete search history.

(56) References Cited

U.S. PATENT DOCUMENTS

| | | |
|---|---|---|
| 422,139 A | 2/1890 | Maxon |
| 2,089,738 A | 8/1937 | Elmer |
| 2,800,219 A | 7/1957 | Carrol |
| 2,913,380 A | 11/1959 | Gullett |
| 3,562,131 A | 2/1971 | Jasberg |
| 3,697,404 A | 10/1972 | Paige |
| 4,013,329 A | 3/1977 | Hugin |
| 4,023,673 A * | 5/1977 | Hansen .......................... 198/494 |
| 4,039,403 A | 8/1977 | Astley et al. |
| 4,073,703 A | 2/1978 | Kinosz |

(Continued)

FOREIGN PATENT DOCUMENTS

| | | |
|---|---|---|
| AU | 622994 | 4/1992 |
| CA | 1 142 123 A1 | 3/1983 |

(Continued)

OTHER PUBLICATIONS

International Search Report dated Jan. 20, 2012 issued in PCT/US2011/053589.

(Continued)

*Primary Examiner* — James R Bidwell
(74) *Attorney, Agent, or Firm* — Harness, Dickey & Pierce, P.L.C.

(57) ABSTRACT

A continuous recovery system for an electrorefiner system may include a trough having a ridge portion and a furrow portion. The furrow portion may include a first section and a second section. An inlet and exit pipe may be connected to the trough. The inlet pipe may include an outlet opening that opens up to the first section of the furrow portion of the trough. The exit pipe may include an entrance opening that opens up to the second section of the furrow portion of the trough. A chain may extend through the inlet and exit pipes and along the furrow portion of the trough. The chain may be in a continuous loop form. A plurality of flights may be secured to the chain. Accordingly, the desired product may be continuously harvested from the electrorefiner system without having to halt the electrical power and/or remove the cathode and anode assemblies.

18 Claims, 5 Drawing Sheets

(56) References Cited

U.S. PATENT DOCUMENTS

| | | | |
|---|---|---|---|
| 4,148,392 A * | 4/1979 | Larson et al. | 198/498 |
| 4,203,531 A | 5/1980 | Reichel et al. | |
| 4,326,937 A | 4/1982 | Neumeier et al. | |
| 4,437,968 A | 3/1984 | Elliott, Jr. | |
| 4,492,621 A | 1/1985 | Stubb | |
| 4,668,353 A | 5/1987 | Smith et al. | |
| 4,851,098 A | 7/1989 | Kimura et al. | |
| 4,863,580 A | 9/1989 | Epner | |
| 4,880,506 A | 11/1989 | Ackerman et al. | |
| 4,946,026 A * | 8/1990 | Rickman | 198/494 |
| 5,415,742 A | 5/1995 | La Camera et al. | |
| 5,454,914 A | 10/1995 | Gay | |
| 5,531,868 A | 7/1996 | Miller et al. | |
| 5,582,706 A | 12/1996 | Grantham et al. | |
| 5,689,538 A | 11/1997 | Bonhomme | |
| 5,770,034 A | 6/1998 | Jansen et al. | |
| 5,935,394 A | 8/1999 | Sivilotti et al. | |
| 6,142,291 A * | 11/2000 | Schulze et al. | 198/727 |
| 6,540,902 B1 | 4/2003 | Redey et al. | |
| 6,689,260 B1 | 2/2004 | Ahluwalia et al. | |
| 6,821,405 B1 | 11/2004 | Marttila | |
| 6,866,768 B2 | 3/2005 | Bradford et al. | |
| 7,090,760 B2 | 8/2006 | Seo et al. | |
| 7,097,747 B1 | 8/2006 | Herceg et al. | |
| 7,449,635 B2 | 11/2008 | Wiant | |
| 7,563,982 B2 | 7/2009 | Kimmel | |
| 7,638,026 B1 | 12/2009 | Willit et al. | |
| 7,799,185 B1 | 9/2010 | Willit | |
| 2004/0007466 A1 | 1/2004 | Seo et al. | |
| 2004/0134785 A1 | 7/2004 | Gay et al. | |
| 2004/0168932 A1 | 9/2004 | Wang | |
| 2005/0067291 A1 | 3/2005 | Haiki et al. | |
| 2005/0205428 A1 | 9/2005 | Dees et al. | |
| 2005/0233634 A1 | 10/2005 | Kollmann | |
| 2007/0082551 A1 | 4/2007 | Oesterhaus | |
| 2007/0295601 A1 | 12/2007 | Bayer | |
| 2008/0128270 A1 | 6/2008 | Hiraiwa et al. | |
| 2008/0142374 A1 | 6/2008 | Iwama et al. | |
| 2008/0152270 A1 | 6/2008 | Engesser et al. | |
| 2009/0050483 A1 | 2/2009 | Li | |
| 2009/0152124 A1 | 6/2009 | Ashford et al. | |
| 2010/0276259 A1 | 11/2010 | Phalen | |
| 2011/0180409 A1 | 7/2011 | Willit et al. | |

FOREIGN PATENT DOCUMENTS

| | | |
|---|---|---|
| DE | 26 00 344 | 7/1977 |
| DE | 3837572 | 5/1989 |
| DE | 19845258 | 3/2000 |
| EP | 0 286 092 | 10/1988 |
| EP | 0 736 929 | 10/1996 |
| EP | 2224542 | 9/2010 |
| GB | 284678 | 11/1928 |
| GB | 506590 A | 5/1939 |
| GB | 516775 | 1/1940 |
| JP | H05279887 | 10/1993 |
| JP | H0972991 | 3/1997 |
| JP | 2006-308442 | 11/2006 |
| WO | WO 02/066709 | 8/2002 |
| WO | WO 2004/018737 | 3/2004 |
| WO | WO 2004/031453 | 4/2004 |
| WO | 2005/035404 A1 | 4/2005 |
| WO | WO 2006/007863 | 1/2006 |
| WO | WO 2009/062005 | 5/2009 |
| WO | WO 2010/080761 | 7/2010 |

OTHER PUBLICATIONS

International Search Report dated Jan. 30, 2012 issued in PCT/US2011/053878.
International Search Report dated Feb. 6, 2012 issued in PCT/US2011/053872.
International Search Report dated May 11, 2012 issued in PCT/US2011/053871.
Jeong, et al., "Electrolytic production of metallic Uranium from U3O8 in a 20-kg batch scale reactor", Journal of Radioanalytical and Nuclear Chemistry, vol. 268, No. 2, pp. 349-356 (2006).
"Proceedings of GLOBAL 2005", Tsukuba, Japan, Oct. 9-13, 2005, Paper No. 488.
"Electrolytic Reduction of Spent Oxide Fuel-Bench-Scale Test Results", Steven D. Herman, Shelly X. Li, Michael F. Simpson.
International search report issued in connection with WO Patent Application No. PCT/US2012/058664.
International Search Report and Written Opinion issued in International Patent Application No. PCT/US2012/058663, issued Aug. 12, 2013.
International Search Report and Written Opinion issued in International Patent Application No. PCT/US2012/058531, issued Aug. 2, 2013.
European Search Report issued in European Patent Application No. 13163951.0, issued Aug. 29, 2013.
International Search Report and Written Opinion issued in International Patent Application No. PCT/US2012/058659, mailed Jul. 5, 2013.
International Search Report and Written Opinion issued in International Patent Application No. PCT/US2012/058661, mailed Jul. 25, 2013.
Figueroa, J. et al., "GTRI Progress in Developing Pyrochemical Processes for Recovery of Fabrication Scrap and Reprocessing of Monolithic U-MO Fuel", RERTR 2011—International Meeting on Reduced Enrichment for Research and Test Reactors, Oct. 23, 2011, XP055071122.

* cited by examiner

100

100

112

CONTINUOUS RECOVERY SYSTEM FOR ELECTROREFINER SYSTEM

FEDERALLY SPONSORED RESEARCH OR DEVELOPMENT

The present invention was made with Government support under contract number DE-AC02-06CH11357, which was awarded by the U.S. Department of Energy.

BACKGROUND

1. Field

The present invention relates to a system for recovering metal from an electrolytic system.

2. Description of Related Art

An electrochemical process may be used to recover metals from an impure feed and/or to extract metals from a metal-oxide. A conventional process (for soluble metal oxides) typically involves dissolving a metal-oxide in an electrolyte followed by electrolytic decomposition or (for insoluble metal oxides) selective electrotransport to reduce the metal-oxide to its corresponding metal. Conventional electrochemical processes for reducing metal-oxides to their corresponding metallic state may employ a single step or multiple-step approach.

A multiple-step approach may be a two-step process that utilizes two separate vessels. For example, the extraction of uranium from the uranium oxide of spent nuclear fuels includes an initial step of reducing the uranium oxide with lithium dissolved in a molten LiCl electrolyte so as to produce uranium metal and $Li_2O$ in a first vessel, wherein the $Li_2O$ remains dissolved in the molten LiCl electrolyte. The process then involves a subsequent step of electrowinning in a second vessel, wherein the dissolved $Li_2O$ in the molten LiCl is electrolytically decomposed to form oxygen gas and regenerate lithium. Consequently, the resulting uranium metal may be extracted in a subsequent electrorefining process, while the molten LiCl with the regenerated lithium may be recycled for use in the reduction step of another batch.

However, a multi-step approach involves a number of engineering complexities, such as issues pertaining to the transfer of molten salt and reductant at high temperatures from one vessel to another. Furthermore, the reduction of oxides in molten salts may be thermodynamically constrained depending on the electrolyte-reductant system. In particular, this thermodynamic constraint will limit the amount of oxides that can be reduced in a given batch. As a result, more frequent transfers of molten electrolyte and reductant will be needed to meet production requirements.

On the other hand, a single-step approach generally involves immersing a metal oxide in a compatible molten electrolyte together with a cathode and anode. By charging the anode and cathode, the metal oxide (which is in electrical contact with the cathode) can be reduced to its corresponding metal through electrolytic conversion and ion exchange through the molten electrolyte. However, although a conventional single-step approach may be less complex than a multi-step approach, the yield of the metallic product is relatively low. Additionally, the metallic product still contains unwanted impurities. Further harvesting the metallic product is relatively difficult, because the electrolytic process is typically stopped and the anode and cathode are removed to allow access to the metallic product. This inefficiency also causes time delays, introduces thermal stresses to structural members, and adds undesired heat to the glovebox environment.

SUMMARY

A continuous recovery system may include a trough having a ridge portion and a furrow portion. The furrow portion may include a first section and a second section. An inlet pipe and an exit pipe may be connected to the trough. The inlet pipe may include an outlet opening that opens up to the first section of the furrow portion of the trough. The exit pipe may include an entrance opening that opens up to the second section of the furrow portion of the trough. A chain may extend through the inlet and exit pipes and along the furrow portion of the trough. The chain may be in a continuous loop form. A plurality of flights may be secured to the chain.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
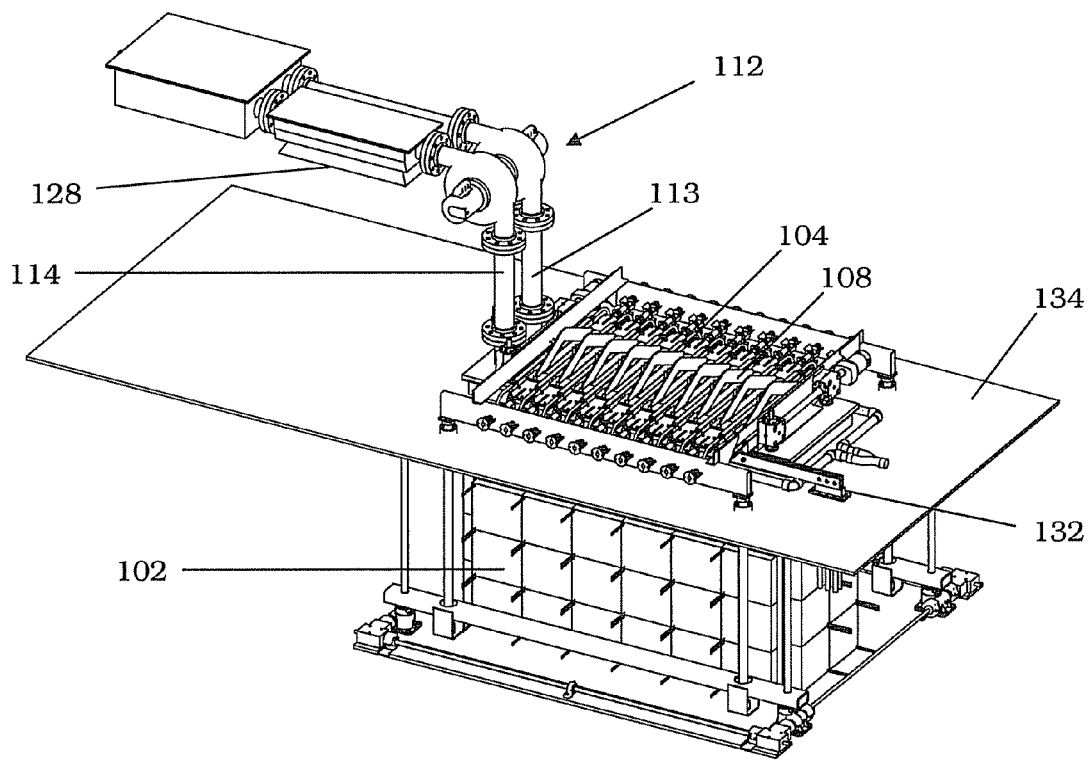
FIG. 1 is a perspective view of an electrorefiner system including a continuous recovery system according to a non-limiting embodiment of the present invention.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the tee ins "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

An electrorefiner system according to a non-limiting embodiment of the present invention may be used to recover a purified metal (e.g., uranium) from a relatively impure nuclear feed material (e.g., impure uranium feed material). The impure nuclear feed material may be a metallic product of an electrolytic oxide reduction system. The electrolytic oxide reduction system may be configured to facilitate the reduction of an oxide to its metallic faun so as to permit the subsequent recovery of the metal. The electrolytic oxide reduction system may be as described in U.S. application Ser. No. 12/978,027, filed Dec. 23, 2010, "ELECTROLYTIC OXIDE REDUCTION SYSTEM," the entire contents of which is incorporated herein by reference.

Generally, the electrorefiner system may include a vessel, a plurality of cathode assemblies, a plurality of anode assemblies, a power system, a scraper, and/or a continuous recovery system. The electrorefiner system may be as described in U.S. application Ser. No. 13/335,082, filed on even date herewith, titled "ELECTROREFINER SYSTEM FOR RECOVERING PURIFIED METAL FROM IMPURE NUCLEAR FEED MATERIAL," the entire contents of which are incorporated herein by reference. The power system may be as described in U.S. application Ser. No. 13/335,121, filed on even date herewith, titled "CATHODE POWER DISTRIBUTION SYSTEM AND METHOD OF USING THE SAME FOR POWER DISTRIBUTION," the entire contents of which are incorporated herein by reference. The scraper may be as described in U.S. application Ser. No. 13/335,209, filed on even date herewith, titled "CATHODE SCRAPER SYSTEM AND METHOD OF USING THE SAME FOR REMOVING URANIUM," the entire contents of which are incorporated herein by reference. However, it should be understood that the electrorefiner system is not limited thereto and may include other components that may not have been specifically identified herein. Furthermore, the electrorefiner system and/or electrolytic oxide reduction system may be used to perform a method for corium and used nuclear fuel stabilization processing. The method may be as described in U.S. application Ser. No. 13/453,290, filed on Apr. 23, 2012, titled "METHOD FOR CORIUM AND USED NUCLEAR FUEL STABILIZATION PROCESSING," the entire contents of which are incorporated herein by reference. A table of the incorporated applications being filed on even date herewith is provided below.

Related Applications Incorporated by Reference

| U.S. application Ser. No. | HDP/GE Ref. | Filing Date | Title |
| --- | --- | --- | --- |
| 13/335,082 | 8564-000252/US 24NS250931 | Filed on even date herewith | ELECTROREFINER SYSTEM FOR RECOVERING PURIFIED METAL FROM IMPURE NUCLEAR FEED MATERIAL |
| 13/335,139 | 8564-000253/US 24AR252782 | Filed on even date herewith | BUS BAR ELECTRICAL FEEDTHROUGH FOR ELECTROREFINER SYSTEM |

-continued

Related Applications Incorporated by Reference

| U.S. application Ser. No. | HDP/GE Ref. | Filing Date | Title |
|---|---|---|---|
| 13/335,121 | 8564-000254/US 24AR252783 | Filed on even date herewith | CATHODE POWER DISTRIBUTION SYSTEM AND METHOD OF USING THE SAME FOR POWER DISTRIBUTION |
| 13/335,209 | 8564-000255/US 24AR252787 | Filed on even date herewith | CATHODE SCRAPER SYSTEM AND METHOD OF USING THE SAME FOR REMOVING URANIUM |
| 13/453,290 | 8564-000262/US 24AR253193 | Filed on 04/23/2012 | METHOD FOR CORIUM AND USED NUCLEAR FUEL STABILIZATION PROCESSING |

As noted above, the impure nuclear feed material for the electrorefiner system may be a metallic product of an electrolytic oxide reduction system. During the operation of an electrolytic oxide reduction system, a plurality of anode and cathode assemblies are immersed in a molten salt electrolyte. In a non-limiting embodiment of the electrolytic oxide reduction system, the molten salt electrolyte may be lithium chloride (LiCl). The molten salt electrolyte may be maintained at a temperature of about 650° C. (+50° C., −30° C.). An electrochemical process is carried out such that a reducing potential is generated at the cathode assemblies, which contain the oxide feed material (e.g., metal oxide). Under the influence of the reducing potential, the metal ion in the metal oxide is reduced and oxygen (O) from the metal oxide (MO) feed material dissolves into the molten salt electrolyte as an oxide ion, thereby leaving the metal (M) behind in the cathode assemblies. The cathode reaction may be as follows:

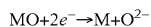

At the anode assemblies, the oxide ion is converted to oxygen gas. The anode shroud of each of the anode assemblies may be used to dilute, cool, and remove the oxygen gas from the electrolytic oxide reduction system during the process. The anode reaction may be as follows:

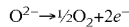

The metal oxide may be uranium dioxide ($UO_2$), and the reduction product may be uranium metal. However, it should be understood that other types of oxides may also be reduced to their corresponding metals with the electrolytic oxide reduction system. Similarly, the molten salt electrolyte used in the electrolytic oxide reduction system is not particularly limited thereto and may vary depending of the oxide feed material to be reduced.

After the electrolytic oxide reduction, the basket containing the metallic product in the electrolytic oxide reduction system is transferred to the electrorefiner system according to the present invention for further processing to obtain a purified metal from the metallic product. Stated more clearly, the metallic product from the electrolytic oxide reduction system will serve as the impure nuclear feed material for the electrorefiner system according to the present invention. Notably, while the basket containing the metallic product is a cathode assembly in the electrolytic oxide reduction system, the basket containing the metallic product is an anode assembly in the electrorefiner system. Compared to prior art apparatuses, the electrorefiner system according to the present invention allows for a significantly greater yield of purified metal.

Figure 2:
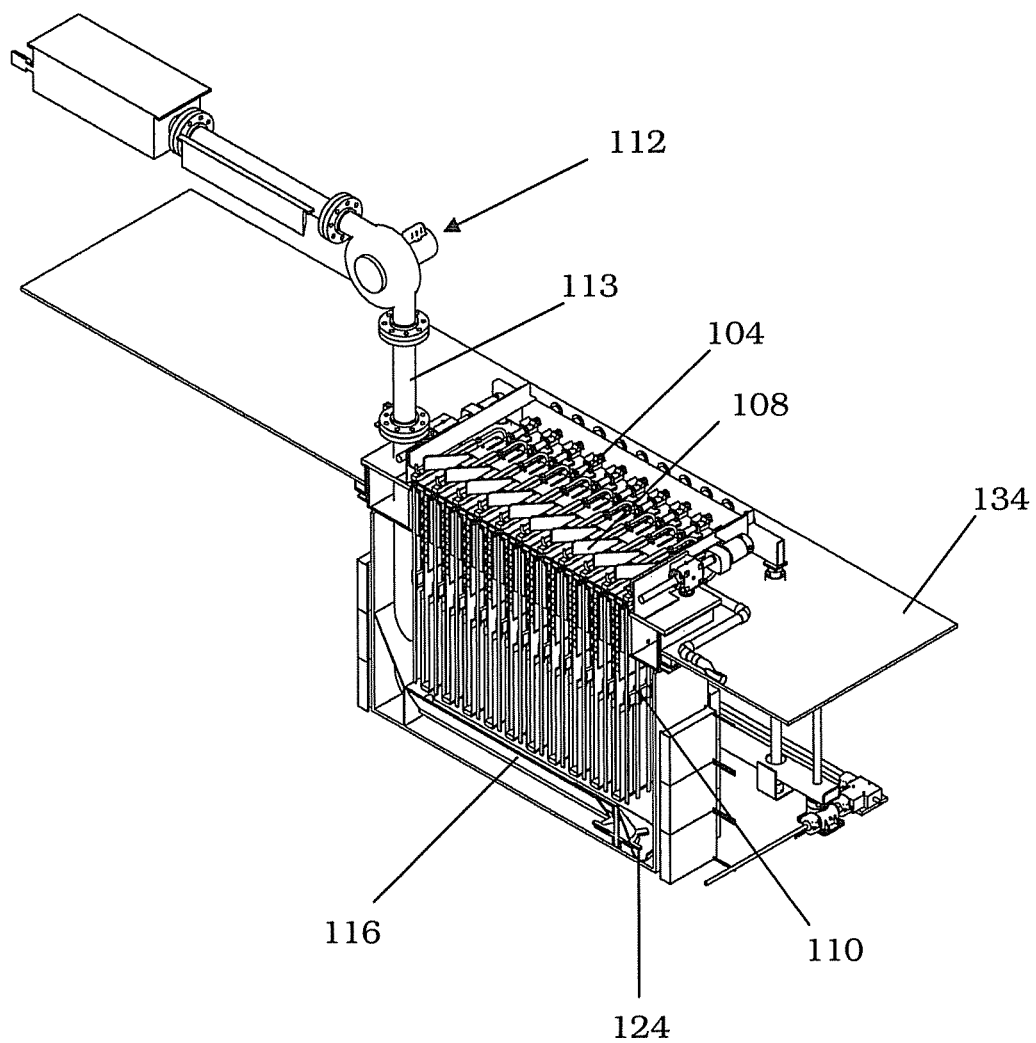
FIG. 2 is a perspective view of a cross-section of an electrorefiner system including a continuous recovery system according to a non-limiting embodiment of the present invention.
Figure 3:
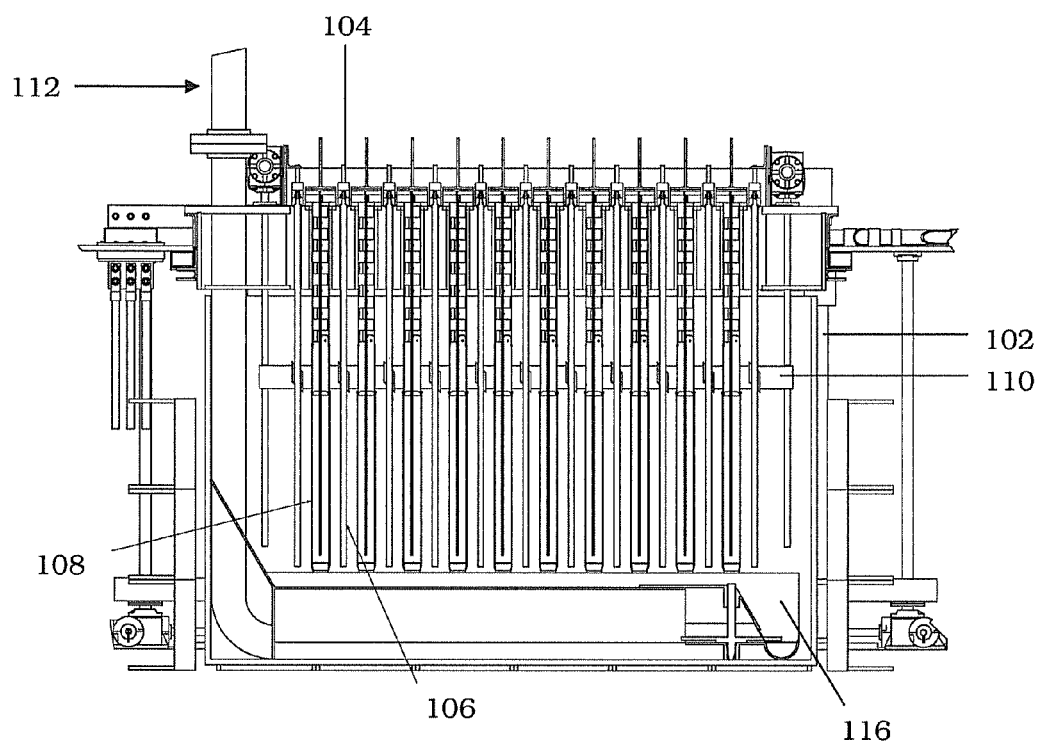
FIG. 3 is a cross-sectional side view of an electrorefiner system including a continuous recovery system according to a non-limiting embodiment of the present invention.
Figure 4:
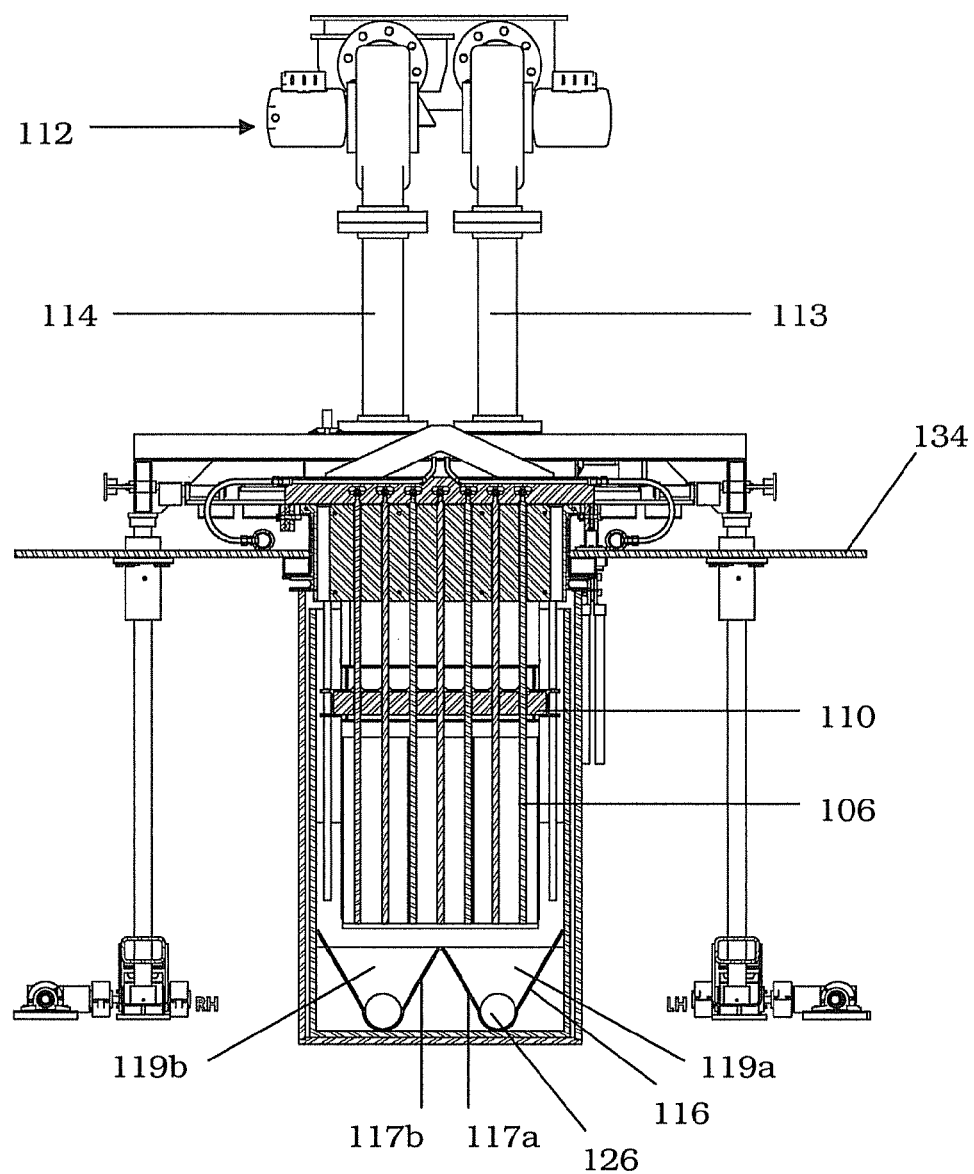
FIG. 4 is a cross-sectional end view of an electrorefiner system including a continuous recovery system according to a non-limiting embodiment of the present invention.

FIG. 1 is a perspective view of an electrorefiner system including a continuous recovery system according to a non-limiting embodiment of the present invention. FIG. 2 is a perspective view of a cross-section of an electrorefiner system including a continuous recovery system according to a non-limiting embodiment of the present invention. FIG. 3 is a cross-sectional side view of an electrorefiner system including a continuous recovery system according to a non-limiting embodiment of the present invention. FIG. 4 is a cross-sectional end view of an electrorefiner system including a continuous recovery system according to a non-limiting embodiment of the present invention.

Referring to FIGS. 1-4, the electrorefiner system 100 includes a vessel 102, a plurality of cathode assemblies 104, a plurality of anode assemblies 108, a power system, a scraper 110, and/or a continuous recovery system 112. Each of the plurality of cathode assemblies 104 may include a plurality of cathode rods 106. The power system may include an electrical feedthrough 132 that extends through the floor structure 134. The floor structure 134 may be a glovebox floor of a glovebox. Alternatively, the floor structure 134 may be a support plate of a hot-cell facility. The continuous recovery system 112 may include an inlet pipe 113, a trough 116, a turn idler 124, a chain, a plurality of flights 126, an exit pipe 114, and/or a discharge chute 128. The continuous recovery system 112 will be described in further detail in connection with FIG. 5.

The vessel 102 is configured to maintain a molten salt electrolyte. In a non-limiting embodiment, the molten salt electrolyte may be LiCl, a LiCl—KCl eutectic, or another suitable medium. The vessel 102 may be situated such that a majority of the vessel 102 is below the floor structure 134. For instance, an upper portion of the vessel 102 may extend above the floor structure 134 through an opening in the floor structure 134. The opening in the floor structure 134 may correspond to the dimensions of the vessel 102. The vessel 102 is configured to receive the plurality of cathode assemblies 104 and the plurality of anode assemblies 108.

The plurality of cathode assemblies 104 are configured to extend into the vessel 102 so as to at least be partially submerged in the molten salt electrolyte. For instance, the dimensions of the plurality of cathode assemblies 104 and/or the vessel 102 may be adjusted such that the majority of the length of the plurality of cathode assemblies 104 is submerged in the molten salt electrolyte in the vessel 102. Each cathode assembly 104 may include a plurality of cathode rods 106 having the same orientation and arranged so as to be within the same plane.

The plurality of anode assemblies 108 may be alternately arranged with the plurality of cathode assemblies 104 such that each anode assembly 108 is flanked by two cathode assemblies 104. The plurality of cathode assemblies 104 and anode assemblies 108 may be arranged in parallel. Each anode assembly 108 may be configured to hold and immerse an impure uranium feed material in the molten salt electrolyte maintained by the vessel 102. The dimensions of the plurality of anode assemblies 108 and/or the vessel 102 may be adjusted such that the majority of the length of the plurality of anode assemblies 108 is submerged in the molten salt electrolyte in the vessel 102. Although the electrorefiner system 100 is illustrated in FIGS. 1-4 as having eleven cathode assemblies 104 and ten anode assemblies 108, it should be understood that the example embodiments herein are not limited thereto.

In the electrorefiner system 100, a power system is connected to the plurality of cathode assemblies 104 and anode assemblies 108. During operation of the electrorefiner system 100, the power system is configured to supply a voltage adequate to oxidize the impure uranium feed material in the plurality of anode assemblies 108 to form uranium ions that migrate through the molten salt electrolyte and deposit on the plurality of cathode rods 106 of the plurality of cathode assemblies 104 as purified uranium.

To initiate the removal of the purified uranium, the scraper 110 is configured to move up and down along the length of the plurality of cathode rods 106 to dislodge the purified uranium deposited on the plurality of cathode rods 106 of the plurality of cathode assemblies 104. As a result of the scraping, the dislodged purified uranium sinks through the molten salt electrolyte to the bottom of the vessel 102.

The continuous recovery system 112 is configured such that at least a portion of it is disposed at the bottom of the vessel 102. For example, the trough 116 of the continuous recovery system 112 may be disposed at the bottom of the vessel 102 such that the purified uranium dislodged from the plurality of cathode rods 106 accumulates in the trough 116. The continuous recovery system 112 is configured to transport the purified uranium accumulated in the trough 116 through an exit pipe 114 so as to remove the purified uranium from the vessel 102.

The continuous recovery system 112 may include an inlet pipe 113, a trough 116, a turn idler 124, a chain, a plurality of flights 126 (FIG. 4), an exit pipe 114, and/or a discharge chute 128. The trough 116 is positioned in the vessel 102 so as to be below the plurality of cathode assemblies 104 and anode assemblies 108. The size of the trough 116 may be adjusted such that the trough 116 covers all or substantially all of the bottom surface of the vessel 102.

The trough 116 may have a V-shaped cross-section, although example embodiments are not limited thereto. Alternatively, the trough 116 may have a U-shaped cross-section. In a non-limiting embodiment, the upper portion of the trough 116 may have a V-shaped cross-section, while the bottom portion of the trough 116 may have a U-shaped or semicircular cross-section. Additionally, the trough 116 may have a U-shaped track along the bottom of the vessel 102. For example, the track may extend linearly from the outlet opening of the inlet pipe 113, curve at a portion corresponding to the opposite end of the vessel 102, and extend linearly to the inlet opening of the exit pipe 114 so as to have a U-shape based on a plan view.

The continuous recovery system 112 is configured to operate continuously or intermittently during the oxidation of the impure uranium feed material held by the plurality of anode assemblies 108, during deposition of the purified uranium on the plurality of cathode assemblies 104, and/or during dislodging of the purified uranium by the scraper 110. The continuous recovery system 112 includes a chain and a plurality of flights 126 secured to the chain. The chain is configured to run along the bottom of the vessel 102 and through the exit pipe 114. The chain and the plurality of flights 126 are configured to engage in an endless motion of entering, exiting, and reentering the vessel 102. For instance, the chain and the plurality of flights 126 may enter the vessel 102 through the inlet pipe 113, travel along the U-shaped track defined by the trough 116 at the bottom of the vessel 102, exit the vessel 102 through the exit pipe 114, and reenter the vessel 102 through the inlet pipe 113.

The plurality of flights 126 secured to the chain may be oriented in the same direction. For instance, the plurality of flights 126 may be oriented perpendicularly to the chain. During operation of the electrorefiner system 100, the plurality of flights 126 are configured to push the purified uranium dislodged by the scraper 110 into and through the exit pipe 114 to a discharge chute 128 so as to remove the purified uranium from the vessel 102. The continuous recovery system 112 is discussed in further detail in connection with FIG. 5.

Figure 5:
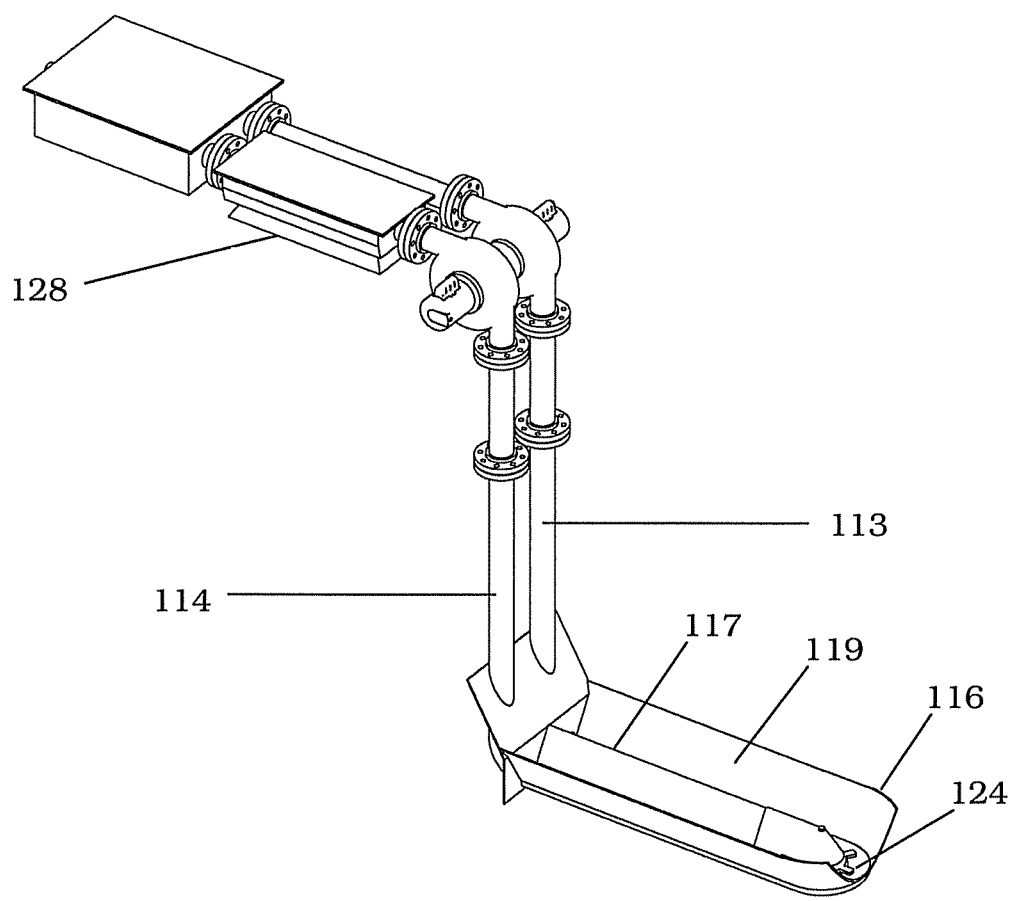
FIG. 5 is a perspective view of a continuous recovery system of an electrorefiner system according to a non-limiting embodiment of the present invention.

FIG. 5 is a perspective view of a continuous recovery system of an electrorefiner system according to a non-limiting embodiment of the present invention. Referring to FIG. 5, a continuous recovery system 112 includes a trough 116 with a ridge portion 117 and a furrow portion 119. The furrow portion 119 may include a first section 119a and a second section 119b (FIG. 4). An inlet pipe 113 is connected to the trough 116. The inlet pipe 113 includes an outlet opening (outlet where the chain comes out of the inlet pipe 113) that opens up to the first section 119a of the furrow portion 119 of the trough 116. An exit pipe 114 is connected to the trough 116. The exit pipe 114 includes an entrance opening (entrance where the chain enters the exit pipe 114) that opens up to the second section 119b of the furrow portion 119 of the trough 116. A chain extends through the inlet pipe 113 and exit pipe 114 and along the furrow portion 119 of the trough 116. The chain may be in a continuous loop form. The direction of the chain may be reversed in a non-limiting embodiment. A plurality of flights 126 (FIG. 4) may be secured to the chain.

The ridge portion 117 may include a first sloping surface 117a and an opposing second sloping surface 117b. The first sloping surface 117a and the second sloping surface 117 may extend upwards to meet so as to form an apex, while the other end may extend downwards to the bottom of the trough 116. The furrow portion 119 may wrap around the ridge portion 117 from the first sloping surface 117a to the second sloping surface 117b. In a non-limiting embodiment, the furrow portion 119 may be directly adjacent to the first sloping surface 117a and the second sloping surface 117b. Based on a plan view, the ridge portion 117 of the trough 116 may be between the first section 119a of the furrow portion 119 and the second section 119b of the furrow portion 119.

The first section 119a of the furrow portion 119 may be parallel to the second section 119b of the furrow portion 119. The furrow portion 119 may include a curved section between the first section 119a and second section 119b. For example, one end of the curved section may be connected to the first section 119a while the other end of the curved section may be connected to the second section 119b. As a result, in a non-limiting embodiment, the furrow portion 119 may be in a faun of a U-shaped track extending from the outlet opening of the inlet pipe 113 to the entrance opening of the exit pipe 114.

The trough 116 may include a first end and an opposing second end. The inlet pipe 113 and exit pipe 114 may be disposed at the first end of the trough 116, and the curved section of the furrow portion 119 may be disposed at the second end of the trough 116. The first section 119a of the furrow portion 119 and/or the second section 119b of the furrow portion 119 may have a V-shaped cross-section. The inlet pipe 113 and exit pipe 114 may extend vertically from the trough 116. For example, the inlet pipe 113 may be aligned with and arranged perpendicularly to the first section 119a of the furrow portion 119 of the trough 116, and the exit pipe 114 may be aligned with and arranged perpendicularly to the second section 119b of the furrow portion 119 of the trough 116. The inlet pipe 113 may be parallel to the exit pipe 114.

The chain and the plurality of flights 126 may be configured to engage in an endless motion of passing through the inlet pipe 113 and exit pipe 114 and moving along the furrow portion 119 of the trough 116. The plurality of flights 126 may be spaced apart from each other on an entire length of the chain at regular intervals. The plurality of flights 126 may be oriented in a same direction. For instance, the plurality of flights 126 may be oriented perpendicularly to the chain. The plurality of flights 126 may have a size and shape that corresponds to inner diameters of the inlet pipe 113 and exit pipe 114. In a non-limiting embodiment, the plurality of flights 126 may have a circular shape. Also, several of the plurality of flights 126 may be designed to scrape/dislodge any purified uranium product that that may be adhering to the inlet pipe 113 and/or exit pipe 114.

The continuous recovery system 112 may further include a discharge chute 128 connected to the exit pipe 114. The discharge chute 128 may be positioned to extend away from the exit pipe 114 so as to not overlap the trough 116. After the discharge chute 128, the chain and plurality of flights 126 return to the vessel 102 via the inlet pipe 113 to collect and transport additional purified uranium product. Additionally, a chain tensioner may be provided after the discharge chute 128 at a point where the chain begins its return path to the vessel 102. The turn idler 124 may be provided at a distal end of the trough 116 relative to the inlet pipe 113 and exit pipe 114. An electric motor drives the chain and plurality of flights 126 through the circuit, wherein the chain and plurality of flights 126 can be operated in a forward or reverse direction. Because the process involves a molten salt electrolyte, the components of the electrorefiner system 100 should be formed of a suitable material capable of withstanding a molten salt electrolyte environment.

A method of electrorefining according to a non-limiting embodiment of the present invention may involve electrolytically processing a suitable feed material with the above-discussed electrorefiner system. As a result, the method may be used to recycle used nuclear fuel or recover a metal (e.g., uranium) from an off-specification metal oxide (e.g., uranium dioxide). Furthermore, the desired product (e.g., purified uranium) may be continuously harvested from the electrorefiner system without having to halt the electrical power and/or remove the cathode assemblies and anode assemblies.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A continuous recovery system comprising:
a trough including a ridge portion and a furrow portion, the furrow portion including a first section and a second section;
an inlet pipe connected to the trough, the inlet pipe including an outlet opening that opens up to the first section of the furrow portion of the trough;
an exit pipe connected to the trough, the exit pipe including an entrance opening that opens up to the second section of the furrow portion of the trough;
a chain extending through the inlet and exit pipes and along the furrow portion of the trough, the chain being in a continuous loop form; and
a plurality of flights secured to the chain,
wherein the furrow portion includes a curved section between the first section and second section, and
wherein the trough includes a first end and an opposing second end, the inlet pipe and exit pipe are disposed at the first end of the trough, and the curved section of the furrow portion is disposed at the second end of the trough.

2. The continuous recovery system of claim 1, wherein the ridge portion includes a first sloping surface and an opposing second sloping surface, the furrow portion wrapping around the ridge portion from the first sloping surface to the second sloping surface.

3. The continuous recovery system of claim 1, wherein the ridge portion of the trough is between the first section of the furrow portion and the second section of the furrow portion.

4. The continuous recovery system of claim 1, wherein the first section of the furrow portion is parallel to the second section of the furrow portion.

5. The continuous recovery system of claim 1, wherein the furrow portion is in a form of a U-shaped track extending from the outlet opening of the inlet pipe to the entrance opening of the exit pipe.

6. The continuous recovery system of claim 1, wherein at least one of the first section of the furrow portion and the second section of the furrow portion has a V-shaped cross-section.

7. The continuous recovery system of claim 1, wherein the inlet pipe is aligned with and arranged perpendicularly to the first section of the furrow portion of the trough, and the exit pipe is aligned with and arranged perpendicularly to the second section of the furrow portion of the trough.

8. The continuous recovery system of claim 1, wherein the inlet pipe is parallel to the exit pipe.

9. The continuous recovery system of claim 1, wherein the chain and the plurality of flights are configured to engage in an endless motion of passing through the inlet pipe and exit pipe and moving along the furrow portion of the trough.

10. The continuous recovery system of claim 1, wherein the plurality of flights are spaced apart from each other on an entire length of the chain at regular intervals.

11. The continuous recovery system of claim 1, wherein the plurality of flights are oriented in a same direction.

12. The continuous recovery system of claim 1, wherein the plurality of flights are oriented perpendicularly to the chain.

13. The continuous recovery system of claim 1, wherein the plurality of flights have a size and shape that corresponds to inner diameters of the inlet pipe and exit pipe.

14. The continuous recovery system of claim 1, wherein the plurality of flights have a circular shape.

15. The continuous recovery system of claim 1, further comprising:
a discharge chute connected to the exit pipe.

16. The continuous recovery system of claim 1, wherein the discharge chute is positioned to extend away from the exit pipe so as to not overlap the trough.

17. The continuous recovery system of claim 1, wherein the plurality of flights are configured to dislodge or scrape material adhering to an interior of at least one of the inlet and exit pipes.

18. A continuous recovery system comprising:
a trough including a ridge portion and a furrow portion, the furrow portion including a first section and a second section;
an inlet pipe connected to the trough, the inlet pipe including an outlet opening that opens up to the first section of the furrow portion of the trough;
an exit pipe connected to the trough, the exit pipe including an entrance opening that opens up to the second section of the furrow portion of the trough;
a chain extending through the inlet and exit pipes and along the furrow portion of the trough, the chain being in a continuous loop form; and
a plurality of flights secured to the chain,
wherein the inlet pipe and exit pipe extend vertically from the trough.

* * * * *